(No Model.)

T. JOHNSTON.
LAWN MOWER.

No. 509,600. Patented Nov. 28, 1893.

Witnesses
S. J. Murphy
C. A. Littlefield

Inventor
Thomas Johnston
per Wilmarth H. Thurston,
Atty.

THE NATIONAL LITHOGRAPHING COMPANY,
WASHINGTON, D. C.

UNITED STATES PATENT OFFICE.

THOMAS JOHNSTON, OF NEWBURG, NEW YORK.

LAWN-MOWER.

SPECIFICATION forming part of Letters Patent No. 509,600, dated November 28, 1893.

Application filed March 2, 1892. Serial No. 423,458. (No model.)

*To all whom it may concern:*

Be it known that I, THOMAS JOHNSTON, of Newburg, in the county of Orange and State of New York, have invented certain new and useful Improvements in Lawn-Mowers; and I do hereby declare the following specification, taken in connection with the accompanying drawings, forming a part of the same, to be a full, clear, and exact description thereof.

The present invention relates to the construction and arrangement of the stationary knife of a lawn-mower and its adjustment with relation to the revolving cutters, and the invention consists, first, in the employment of a knife formed in the arc of a circle and so arranged that its bevel will lie in a plane substantially tangent to the circle described by the revolving cutters, and, second, in making the knife independently adjustable with relation to the fixed knife-bar, and providing means for accurately effecting the adjustment of the knife.

Figure 1:
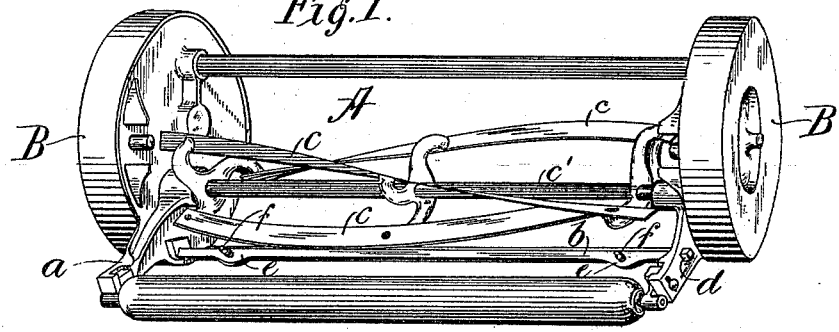
Figure 2:
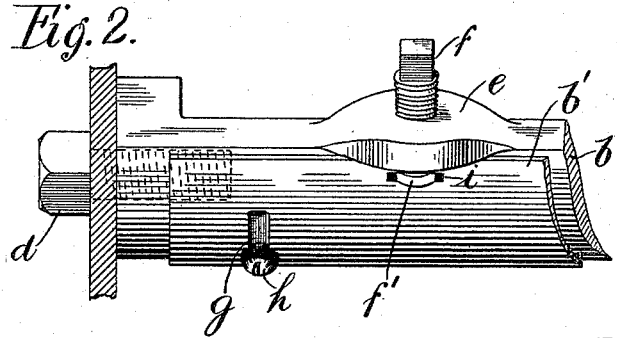
Figure 3:
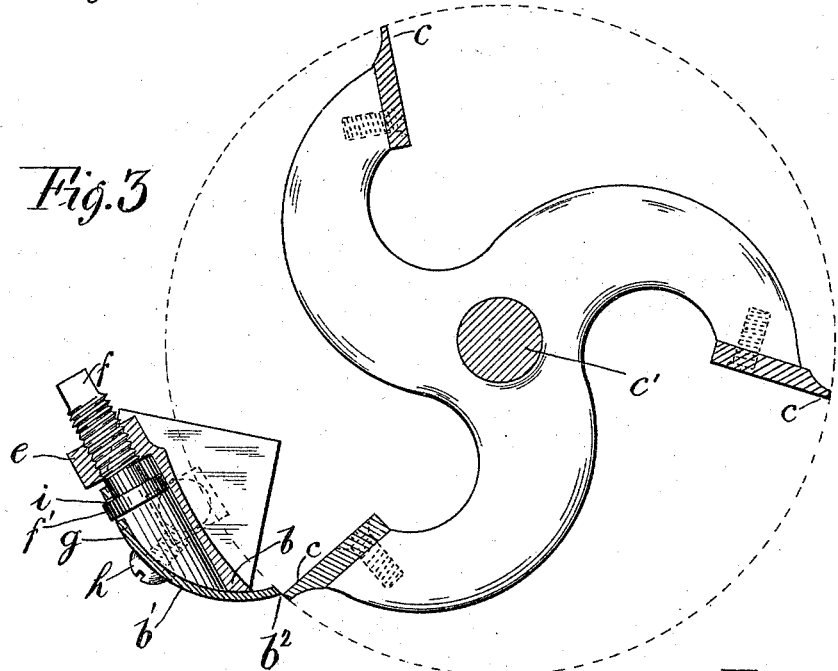

Referring to the drawings, Figure 1 is a view in perspective of a lawn mower embodying my improvements. Fig. 2 is a view, partly in section, of a portion of my improved knife and knife-bar, showing the manner of adjusting the knife with relation to said knife-bar; and Fig. 3 is a transverse section upon an enlarged scale, showing the construction of the knife and its location and arrangement with relation to the path of the revolving cutters.

A, Fig. 1, represents a lawn mower embodying the improvements hereinafter described, said mower being composed as a whole of the frame-work $a$, the wheels B, B, the knife-bar $b$, the revolving cutters $c$, with their axial shaft $c'$, and the other parts which go to make up a mower of the character referred to. The parts shown are all of the usual construction, except the stationary knife and knife-bar, and such other parts will therefore require no particular description in this connection. The knife $b'$, instead of being straight or flat, is formed in the arc of a circle, so arranged that its bevel will lie in a plane substantially tangent to the circle described by the revolving cutters $c$, as clearly shown in Fig. 3. With this construction and arrangement of the stationary knife, the revolving cutters will strike square across the edge of said knife, and any wear which takes place will not serve to increase the width of the wearing surface, but, on the contrary, the knife will be worn away evenly, and will always present the same extent of surface to the action of the revolving cutters. As a result, the knife does not require to be taken out to be ground to secure the necessary clearance, but, on the contrary, the revolving cutters will so strike the stationary knife as to wear it in the proper manner to provide and maintain the required clearance. By the construction and arrangement of the stationary knife above described, a comparatively thin knife of substantially uniform thickness throughout its width may be employed, and the revolving cutters striking the knife as they do can never produce any broader wearing surface at the edge of the knife than the thickness of the knife, the only effect of the action of the revolving cutters being to simply wear away or reduce the width of the knife.

While the construction and arrangement of knife above described is believed to be novel independent of any particular method of adjusting said knife, I have devised a new method of adjusting the stationary knife of a lawn mower which is particularly useful in connection with a knife of the character referred to, and such method of adjustment constitutes the second feature of my invention. The knife bar $b$, instead of being adjustably secured to the frame $a$ of the machine as heretofore, is rigidly bolted to said frame by the bolts $d$, and when once secured in place its position is never changed. For the attachment of a knife formed in the arc of a circle, as $b'$, the back of the knife-bar is likewise formed in the arc of a circle, as shown at Fig. 2. At the back of the knife-bar $b$ are formed two ears or enlargements $e, e$, cast integral with the knife-bar and tapped to receive the adjusting screws $f, f$. In the knife $b'$ are formed two or more transverse slots $g$ through which pass the screws $h$ tapped into the body of the knife-bar, and by means of which screws $h$ the knife is clamped upon the knife-bar, the slots $g$ permitting of the adjustment of the knife with relation to the knife-bar, as hereinafter described. The knife $b'$ is also provided near its rear edge with two longitudinal slots $i$ (only one of these slots being shown in the drawings, as the knife and knife-bar are shown broken away in Fig.

2) adapted to be engaged by the heads $f'$ of the adjusting screws $f$. The body of the knife-bar is cut away in line with the adjusting screws $f$, as shown in Fig. 3, to permit the necessary movement of said screws. The knife $b'$ being placed in position upon the knife-bar, and so that the heads $f'$ of the screws $f$ engage the slots $i$ in the knife, the screws $h$ are inserted and set up to clamp the knife in proper position on the knife-bar. Preferably the back of the knife-bar is formed in the arc of a circle of somewhat greater radius than that of the knife, and so that in clamping the knife upon the knife-bar, the knife will be sprung down somewhat along its central longitudinal line, and thus be more firmly clamped. When now sufficient wear has taken place to make it desirable to adjust the knife $b'$ with relation to the revolving cutters $c$, all that is required is to simply turn the adjusting screws $f$, the ends of which may be squared for the reception of a wrench or provided with a slot for a screw driver as preferred, so as to force the knife toward the path of the revolving cutters, the slots $g$ permitting the knife to slide around or upon the knife-bar, as will be readily understood. If the knife does not move sufficiently easy under the action of the adjusting screws $f$, the clamp screws $h$ may be eased up and again set up when the knife has been adjusted. I have found in practice, however, that this is not usually necessary.

By the method of adjustment above described, it is never necessary to change the position of the knife-bar when once secured in place, and there is consequently no liability of cramping such knife-bar or of springing the frame as the result of such cramping. As the knife-bar requires no adjustment, but remains always in the same position, the mechanism heretofore required for adjusting the knife-bar is entirely dispensed with and the construction of the machine consequently simplified. The adjustment of the knife in the present arrangement is a very simple matter, and as the ends of the adjusting screws project upward, they may be readily gotten at and the necessary adjustment easily and quickly effected without turning over the machine or lifting it from the ground. Moreover, as the knife in its adjustment swings in the arc of a circle corresponding to the arc in which the knife itself is formed, the cutting edge of the knife will always occupy substantially the same position with relation to the path of the revolving cutters in any and all adjusted positions of the knife, and will always stand at substantially the same angle to a perpendicular line drawn through the axis of the revolving cutters.

What I claim as my invention, and desire to secure by Letters Patent, is—

1. A knife for lawn-mowers constructed substantially in the arc of a circle and adapted to be adjusted in said arc and having its bevel formed substantially as shown and described, whereby when said knife is in place in a lawn-mower its bevel will lie in a plane substantially tangent to the circle described by the revolving cutters, substantially as described.

2. In a lawn-mower, the combination, with the revolving cutters, of a stationary knife whose cross-section lies substantially in the arc of a circle which cuts the circle described by said revolving cutters, said stationary knife being adjustable in said arc and having its bevel lying in a plane substantially tangent to the circle described by said revolving cutters, substantially as described.

3. In a lawn-mower, the combination, with the frame of said mower and the revolving cutters, of a knife-bar rigidly secured to said frame, and a knife adjustably attached to said knife-bar, the cross-section of said knife lying in the arc of a circle which cuts the circle described by said revolving cutters, said stationary knife being adjustable in said arc and having its bevel lying in a plane substantially tangent to the circle described by said revolving cutters, substantially as described.

4. In a lawn-mower, the combination, with the frame of said mower, of a knife bar rigidly secured to said frame, a knife adjustably attached to said knife bar, and adjusting screws mounted in said knife bar and connected to said knife, whereby said knife may be moved and accurately adjusted in either direction with relation to said knife bar by means of said adjusting screws, substantially as described.

5. The combination, with the frame $a$, of a knife bar $b$ rigidly secured to said frame, a knife $b'$ provided with transverse slots $g$ and with longitudinal slots $i$, clamp screws $h$ for adjustably securing the knife to said knife bar, and adjusting screws $f$ mounted in the knife bar, and the ends of which engage the slots $i$ in the knife, substantially as described.

THOMAS JOHNSTON.

Witnesses:
EDWIN T. SMITH,
CHAS. H. HALSTEAD.